(12) United States Patent
Aarts et al.

(10) Patent No.: US 8,059,201 B2
(45) Date of Patent: Nov. 15, 2011

(54) METHOD AND APPARATUS FOR PROVIDING A VIDEO SIGNAL

(75) Inventors: Ronaldus Maria Aarts, Eindhoven (NL); Gerard Henri Bloemen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 481 days.

(21) Appl. No.: 10/576,166

(22) PCT Filed: Oct. 12, 2004

(86) PCT No.: PCT/IB2004/052066
§ 371 (c)(1),
(2), (4) Date: Apr. 19, 2006

(87) PCT Pub. No.: WO2005/041192
PCT Pub. Date: May 6, 2005

(65) Prior Publication Data
US 2007/0035666 A1 Feb. 15, 2007

(30) Foreign Application Priority Data
Oct. 24, 2003 (EP) .................................... 03103945

(51) Int. Cl.
*H04N 5/445* (2006.01)
*G06F 3/00* (2006.01)

(52) U.S. Cl. ......................... 348/564; 348/588; 715/723

(58) Field of Classification Search .......... 348/563–567, 348/584, 588; 386/278; 715/723, 724
See application file for complete search history.

(56) References Cited

U.S. PATENT DOCUMENTS

| | | | |
|---|---|---|---|
| 5,225,946 A | 7/1993 | Uchiumi | |
| 5,365,384 A | 11/1994 | Choi | |
| 5,457,669 A | 10/1995 | Kim et al. | |
| 6,493,038 B1 * | 12/2002 | Singh et al. | 348/565 |
| 6,538,665 B2 * | 3/2003 | Crow et al. | 715/723 |
| 6,724,434 B1 * | 4/2004 | Aaltonen | 348/565 |
| 7,119,851 B2 * | 10/2006 | Ono | 348/581 |
| 2002/0186234 A1 | 12/2002 | Van De Streek et al. | |

FOREIGN PATENT DOCUMENTS

| | | |
|---|---|---|
| EP | 0724211 A2 | 7/1996 |
| WO | 9612240 A1 | 4/1996 |
| WO | 0249354 A1 | 6/2002 |

* cited by examiner

*Primary Examiner* — Michael Lee

(57) ABSTRACT

A method of providing a video signal for display of a stream of video data (200) at a rate other than real-time, the video data being built up from frames, includes real-time rendering of non-contiguous segments of the stream of video data having multiple subsequent frames to a first rendered stream, non-real-time rendering of the stream of video data by rendering pre-determined non-subsequent frames at a speed other than real-time to a second rendered stream; and multiplexing the first rendered stream and the second rendered stream for simultaneous display on a display device (150), wherein the first rendered stream is displayed on a first part (310) of the display device, and the second rendered stream is displayed on a second part (320) of the display device.

12 Claims, 2 Drawing Sheets

METHOD AND APPARATUS FOR PROVIDING A VIDEO SIGNAL

FIELD OF THE INVENTION

The invention relates to a method of providing a video signal for display of a stream of video data at a rate other than real-time, the video data being built up from frames, the method comprising the step of real-time rendering of non-contiguous segments of the stream of video data comprising multiple subsequent frames to a first rendered stream.

The invention further relates to an apparatus for providing a video signal for display of a stream of video data at a rate other than real-time, the video data being built up from frames, the method comprising a first rendering unit for real-time rendering of non-contiguous segments of the stream of video data comprising multiple subsequent frames to a first rendered stream.

The invention also relates to a record carrier comprising computer executable code.

Furthermore, the invention relates to a programmed computer.

DESCRIPTION OF THE RELATED ART

An embodiment of the aforementioned method is known from the granted U.S. Pat. No. 5,457,669. This patent discloses a program search method including the steps of reproducing the program for a predetermined reproduction period after performing a jump step by a predetermined search interval and repeatedly performing the jumping and reproducing steps.

A disadvantage of such a method is that a user easily loses track of the location at which the program is reproduced. This is especially the case when there are frequent scene changes and/or a large search interval. First, a user will easily lose any understanding of the search direction. Second, the user might miss some scenes, especially in case of frequent scene changes and a large search interval and in that way, lose the global understanding of the program.

SUMMARY OF THE INVENTION

It is an objective of the invention to provide better user feedback using the aforementioned method.

This object is achieved with the method according to the invention, characterized in that the method further comprises the step of: non real-time rendering of the stream of video data by rendering pre-determined non subsequent frames at a speed other than real-time to a second rendered stream; multiplexing the first rendered stream and the second rendered stream for simultaneous display on a display device, wherein the first rendered stream is displayed on a first part of the display device, and the second rendered stream is displayed on a second part of the display device.

By non real-time rendering of the stream of video data by rendering pre-determined non-subsequent frames at a speed other than real-time, a stream is obtained as is usually obtained when, for example, fast-forwarding a film on a standard DVD player. In such a stream, the direction of the playback can easily be seen, for example, when a person is shown who is walking backward instead of forward, especially at playback speeds which are not too high. This type of playback, however, has the disadvantage that it is very difficult to render synchronously with audio, while play-back with audio increases the information delivered to a user. Therefore, rendering of two streams is provided in the method according to the invention.

In an embodiment of the method according to the invention, the second part of the display device is significantly smaller than the full size of the display device and the first part of the display is the complement to the second part.

An advantage of this embodiment is that the real-time rendered part of the stream, which is usually the most convenient to view for a user, of data is provided on a large area. The second rendered stream is provided only for navigation and orientation purposes to provide a global impression. Therefore, it is not a big problem to provide this on a small part of the display device.

A further embodiment of the method according to the invention comprises the steps of providing a first bar representative of the stream of video data and indicating, on the first bar, a location of the first rendered stream that is displayed on the first part of the display device.

An advantage of this embodiment is that a user is given an indication which part of the stream of audiovisual data is rendered and shown on a screen.

Alternatively, an embodiment according to the invention further comprises the steps of providing a second bar representative of the stream of video data and indicating, on the second bar, a location of the second rendered stream that is displayed on the second part of the display device.

Another embodiment of the method according to the invention comprises the step of providing an indicator indicative of the direction of the non-real-time rendering.

The apparatus according to the invention is characterized in that the apparatus further comprises a second rendering unit for non-real-time rendering of the stream of video data by rendering pre-determined non-subsequent frames at a speed other than real-time to a second rendered stream; and a multiplexer for multiplexing the first rendered stream and the second rendered stream for simultaneous display on a display device, wherein the first rendered stream is displayed on a first part of the display device; and the second rendered stream is displayed on a second part of the display device.

With respect to the record carrier according to the invention, the computer executable code enables a processing unit to perform the method according to claim 1.

The programmed computer according to the invention is enabled to execute the method according to claim 1.

BRIEF DESCRIPTION OF THE DRAWINGS

The invention will now be further elucidated by describing embodiments depicted in Figs., wherein.

DESCRIPTION OF THE PREFERRED EMBODIMENTS

Figure 1:
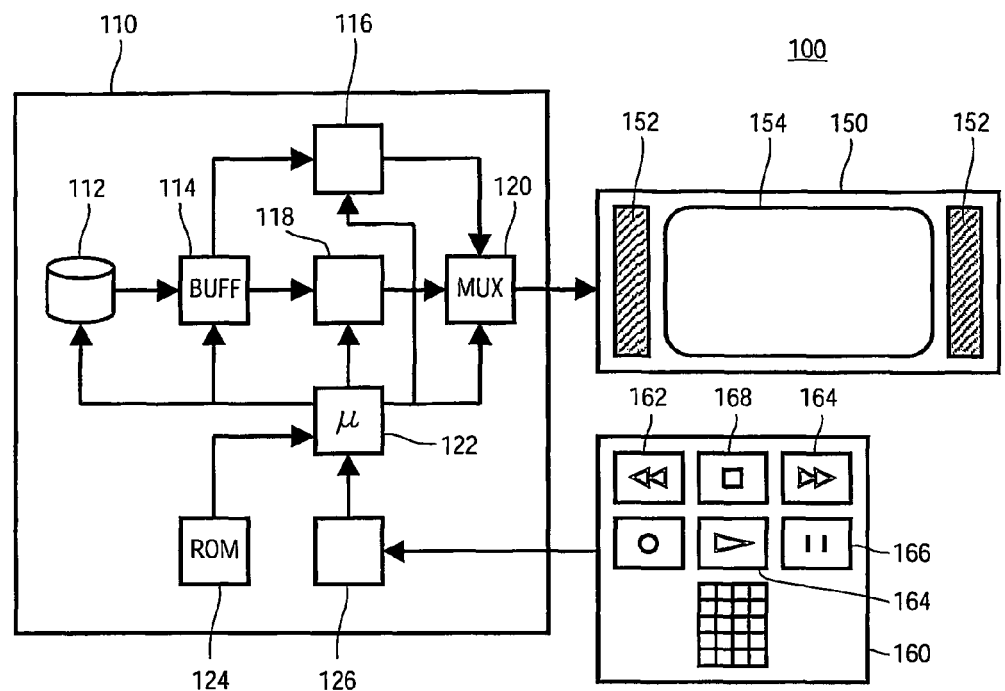
FIG. 1 shows a consumer electronics system comprising an embodiment of the apparatus according to the invention.

FIG. 1 shows a consumer electronics system 100 comprising a video processing apparatus 110 as an embodiment of the apparatus according to the invention, a TV-set 150 and a user control device 160.

The video processing apparatus 110 comprises a harddisk drive 112 as an embodiment of a storage device, a buffer 114, a first rendering unit 116, a second rendering unit 118, a video multiplexing unit 120, a micro-controller 122 for controlling the components of the video processing apparatus 110, a ROM memory 124 and a user control command receiver 126.

The TV-set 150 comprises two speakers 152 and a screen 154 as a display device.

The user control device 160 comprises a fast-rewind button 162, a real-time play button 164, a fast-forward button 166, a pause button 168 and a stop button 170.

When performing fast trickplay—fast-forward or fast-rewind—while displaying video data on the screen 154 according to the invention, data is retrieved from the harddisk drive 112 and stored in the buffer 114. It should be mentioned that the buffer 114 is optional, i.e., data can also be read directly from the harddisk drive 112. A buffer is, however, preferred since in that case, data has to be read only once from the harddisk drive 112, as will be apparent from the further description.

Using the method according to the invention, at least two rendered streams are produced. A first rendered stream is produced by real-time rendering of non-contiguous segments of the stream of video data comprising multiple subsequent frames by the first rendering unit 116. Also, a second stream is produced by non-real-time rendering of the stream of video data by rendering pre-determined non-subsequent frames at a speed other than real-time by the second rendering unit 118, for example, at a higher speed.

To execute the method according to the invention, the rendering units are controlled by the micro-controller 122 for controlling the components of the video storage apparatus 110. The instructions for the micro-controller 122 for executing the method according to the invention are, in this embodiment, stored in the ROM memory 124 as an embodiment of a computer-readable medium according to the invention.

Figure 2:
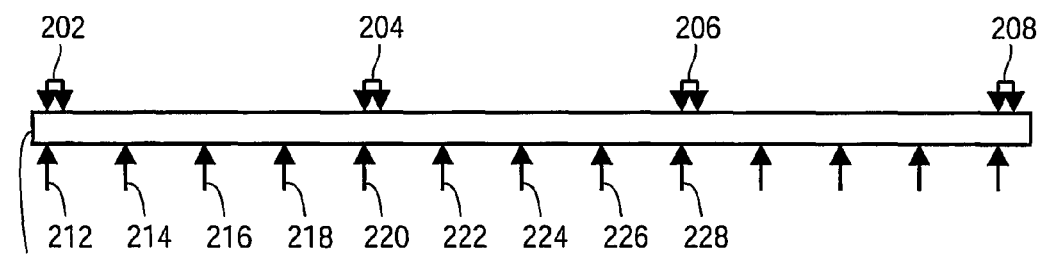
FIG. 2 shows a stream of audiovisual data to elucidate an embodiment of the method according to the invention.

The operation of the video processing apparatus 110 and embodiments of the method according to the invention will be elucidated by FIG. 1 and by FIG. 2 depicting a stream of video data 200. The stream of video data 200 is built up from frames.

When a user instructs the video processing apparatus 110 to render a stream of video data 200 at a speed higher than real-time in fast-forward mode, the user pushes the fast-forward button 164 on the user control device 160. The user command is received by the user control command receiver 126, which forwards it to the micro-controller 122. The micro-controller 122 instructs the buffer 114 to retrieve a first portion of the video stream 200 between the left-most arrow of a first indicator 202 and the left-most arrow of a second indicator 204 from the harddisk drive 112 and to buffer the retrieved portion of the video stream.

Next, a part of the first portion of the stream 200 between the left-most arrow and right-most arrow of the first indicator 202 is retrieved from the buffer 114 and is rendered by the first rendering unit 116 to form a first rendered stream by real-time rendering of this part of the first portion of the stream 200. In this embodiment, the first rendered stream has a pre-determined duration.

Simultaneously, pre-determined non-subsequent frames of the first portion of the stream 200 are retrieved from the buffer 114 and rendered by the second rendering unit 118 to provide a second rendered stream with the same pre-determined duration as the first rendered stream. The pre-determined frames are, for example, intra-coded frames when the stream 200 is encoded according to the MPEG (Motion Pictures Expert Group) standard. In FIG. 2, they are, for the first portion, indicated by a first arrow 212, a second arrow 214, a third arrow 216 and a fourth arrow 218.

The second and the first streams are rendered simultaneously. This means that as the first frame of the segment indicated by the first indicator 202 is rendered to the rendered first stream, the frame indicated by the first arrow 212 is rendered to the second rendered stream. Furthermore, as the segment indicated by the first indicator 202 is rendered, the frames indicated by the second arrow 214, the third arrow 216 and the fourth arrow 218 are rendered to the second rendered stream. Subsequently, the first frame of the segment indicated by the second indicator 204 is rendered simultaneously with the frame indicated by a fifth arrow 220. In this way, the stream 200 is rendered at a speed faster than real-time.

This is the point where the advantage of the buffer 114 comes in. When the first portion of the stream 200 is retrieved directly from the harddisk drive 112 by both rendering units individually, the harddisk drive 112 is busy for a longer time, since during rendering to obtain the second rendered stream multiple frames continuously have to be retrieved. When they are retrieved at once, the harddisk drive 112 is available for further processes.

Advantageously, only the part of the first portion of the stream 200 between the left-most arrow and right-most arrow of the first indicator 202 and the frames indicated by the first arrow 212, the second arrow 214, the third arrow 216 and the fourth arrow 218 are buffered.

When the first portion of the stream 200 between the left-most arrow and right-most arrow of the first indicator 202 and the pre-determined frames of the first portion are rendered, a second portion of the stream 200 between a fifth arrow 220 and a later arrow 228 is retrieved from the harddisk drive 112 and stored in the buffer 114 for further rendering.

Both rendered streams are sent to the video multiplexing unit 120, where they are multiplexed to be displayed simultaneously on the screen 154, wherein each rendered stream is displayed in a pre-determined part of the screen 154.

Advantageously, sound is rendered and provided to the TV-set as well, accompanying the first rendered stream. The sound is provided to a user via the two speakers 152. The sound is provided at the speed of the first stream, which is preferably real-time.

It will be apparent to a person skilled in the art that additional features are needed for properly providing a signal to the TV-set 150, like a D/A converter. However, since they are apparent, they have been omitted in FIG. 1 for sake of simplicity and overview.

When the stream 200 is compressed and/or encrypted, the multiplexing may take place either in the compressed and/or encrypted domain, or in the non-compressed and/or decrypted domain. In the first case, the rendering units are replaced by simple processing units retrieving the proper frames from the buffer 114 and the actual rendering is done after multiplexing. In this case, an additional rendering unit (not shown) has to be inserted in the video processing apparatus 110.

In the latter case, the decryption and/or decompression is performed by the rendering units or by separate decryption and/or decompression units that are placed between the harddisk drive 112 and the rendering units. There are several embodiments for this: in one embodiment, one rendering unit (not shown) is placed between the harddisk drive 112 and the buffer 114. In a further embodiment, a first decryption (or decompression) unit is placed between the buffer 114 and the first rendering unit 116 and a second first decryption (or decompression) unit is placed between the buffer 114 and the second rendering unit 116. This kind of additions to and permutations of the elements of the embodiment described are obvious by a person skilled in the art and can be performed without departing from the scope of the invention.

Figure 3A:
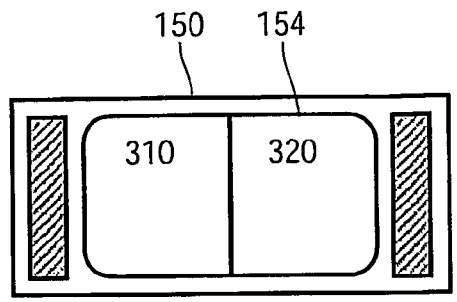
FIG. 3A shows a screen to depict an embodiment of the method according to the invention.
Figure 3B:
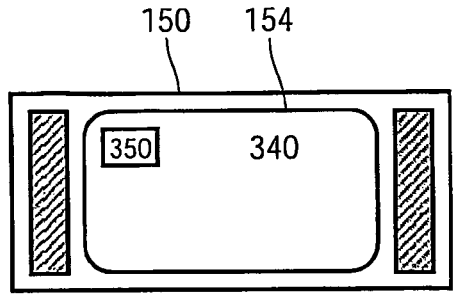
FIG. 3B shows a screen to depict another embodiment of the method according to the invention.

When the stream of video data 200 is displayed using the method according to the invention, wherein each rendered stream is displayed on a pre-determined part of the display device 154, various embodiments are possible, some of which are presented by FIG. 3A and FIG. 3B.

FIG. 3A shows the TV-set 150 with the screen 154 on which a first part 310 and a second part 320 are indicated, both parts occupying half the area of the screen to elucidated an embodiment of the method according to the invention. A first rendered stream obtained by real-time rendering of non-contiguous segments of a stream of video data comprising multiple subsequent frames is displayed on the first part 310 and a second rendered stream obtained by non-real-time rendering of the stream of video data by rendering pre-determined non-subsequent frames at a speed higher than real-time is displayed on the second part 320.

FIG. 3B shows the TV-set 150 with the screen 154 on which a first part 340 and a second part 350 are indicated to elucidate a further embodiment of the method according to the invention, wherein the second part 350 is substantially smaller than the first part 340. A first rendered stream obtained as described in the previous paragraph is displayed on the first part 340 and a second rendered stream obtained as described in the previous paragraph is displayed on the second part 350.

It will be apparent for a person skilled in the art that a further embodiment of the invention is possible, wherein the first rendered stream is displayed on the second part 350 and the second rendered stream is displayed on the first part 340. In another embodiment, a user may even switch between both modes described here, swap the displayed streams in the first part 340 and the second part 350.

To further enhance navigation of a user through a stream of video data during trickplay wherein the stream is displayed using an embodiment of the method according to the invention, navigation bars are introduced according to an embodiment of the invention. This is elucidated by FIG. 4A and FIG. 4B.

Figure 4A:
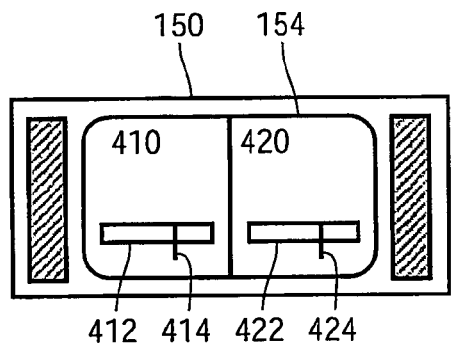
FIG. 4A shows a screen to depict a further embodiment of the method according to the invention.

FIG. 4A shows the TV-set 150 with the screen 154 on which a first part 410 and a second part 420 are indicated. A first rendered stream obtained as described above is displayed on the first part 410 and a second rendered stream obtained as described above is displayed on the second part 420. Furthermore, a first bar 412 with a first indicator 414 and a second bar 422 with a second indicator 424 are displayed on the screen 154.

Both bars represent at least a portion of a stream of video data that is displayed on the screen 154. The first bar 412 is displayed on the first part 410 of the screen 154 and the first indicator 414 indicates the location at which the stream of video data is displayed on the first part 410. The second bar 422 is displayed on the second part 420 of the screen 154 and the second indicator 424 indicates the location at which the stream of video data is displayed on the second part 420.

Figure 4B:
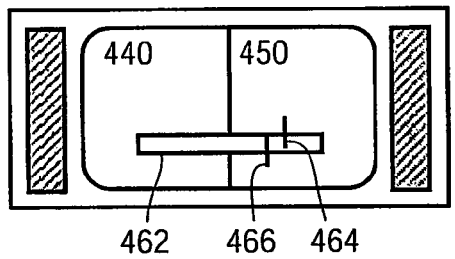
FIG. 4B shows a screen to depict yet another embodiment of the method according to the invention.

FIG. 4B shows the TV-set 150 with the screen 154 on which a first part 440 and a second part 450 are indicated. A first rendered stream obtained as described above is displayed on the first part 440 and a second rendered stream obtained as described above is displayed on the second part 450. Furthermore, a bar 462 with a first indicator 464 and a second indicator 466 are displayed on the screen 154.

The bar 462 represents at least a portion of a stream of video data that is displayed on the screen 154. The first indicator 464 indicates the location at which the stream of video data is displayed on the first part 440. The second indicator 466 indicates the location at which the stream of video data is displayed on the second part 450.

In a further embodiment borders with different colors are placed around the first part 440 and the second part 450. A color surrounding the first part corresponds with the first indicator 464 and a color surrounding the second part corresponds with the second indicator 466.

When non-contiguous segments of a stream of video data are to be displayed in real-time using the method according to the invention, it might be difficult for a user to keep track of the direction in which the video data is rendered, i.e., backward or forward. To facilitate the user feedback, in an embodiment of the invention, an indicator is provided that indicates the direction of the rendering. This indicator, for example, has the shape of an arrow, pointing either to the left side (backward rendering) or to the right side (forward rendering).

Figure 5:
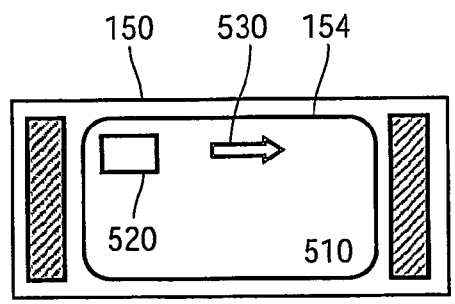
FIG. 5 shows a screen to depict yet a further embodiment of the method according to the invention.

This is indicated in FIG. 5, depicting the TV-set 150 with the screen 154, a first region 510, a second region 520 and an indicator 530 indicating that the rendering direction of the video is forward.

It will be apparent to any person skilled in the art that numerous variations based on the embodiments described are possible without departing from the scope of the invention. Process steps performed by multiple elements can be grouped and performed by only one processing element and on the other hand, processing steps performing multiple steps in the embodiments may just as well be taken apart and performed by multiple processing blocks. This also means that all process steps can be performed by a single processor of a programmed computer.

In summary, The invention relates to a method of providing a video signal for display of a stream of video data at a rate other than real-time, the video data being built up from frames, the method comprising the step of real-time rendering of non-contiguous segments of the stream of video data comprising multiple subsequent frames to a first rendered stream; wherein the method further comprises the step of non-real-time rendering of the stream of video data by rendering pre-determined non-subsequent frames at a speed other than real-time to a second rendered stream;

multiplexing the first rendered stream and the second rendered stream for simultaneous display on a display device, wherein: the first rendered stream is displayed on a first part of the display device; and the second rendered stream is displayed on a second part of the display device.

The invention claimed is:

1. A method of providing a video signal for display of a stream of video data at a rate other than real-time, the stream of video data being built up from subsequent frames, the method comprising the steps of:
   selecting a plurality of non-contiguous segments of the stream of video data, each of said non-contiguous segments comprising multiple subsequent frames;
   real-time rendering said plurality of non-contiguous segments in a concatenated manner to form a first rendered stream having a first rate other than real-time;

selecting a plurality of pre-determined non-subsequent frames of said stream of video data;

non-real-time rendering said pre-determined non-subsequent frames in a concatenated manner to form a second rendered stream having a second rate other than real-time; and multiplexing the first rendered stream and the second rendered stream for simultaneous display on a display device, wherein the first rendered stream is displayed on a first part of the display device and the second rendered stream is displayed on a second part of the display device; and wherein the second rate is greater than the first rate and real-time.

2. The method according to claim 1, wherein the second part of the display device is significantly smaller than the full size of the display device and the first part of the display is the complement to the second part.

3. The method according to claim 1, wherein the first part of the display device is significantly smaller than the full size of the display device and the second part of the display is the complement to the second part.

4. The method according to claim 1, wherein the first part of the display device and the second part of the display device have mutually equal sizes.

5. The method according to claim 1, wherein the method further comprises the steps of:
providing a first bar representative of the stream of video data; and
indicating on the first bar a location in the stream of video data of the first rendered stream that is displayed on the first part of the display device.

6. The method according to claim 1, wherein the method further comprises the steps of:
providing a second bar representative of the stream of video data; and
indicating on the second bar a location in the stream of video data of the second rendered stream that is displayed on the second part of the display device.

7. The method according to claim 5, wherein the method further comprises the step of:
indicating on the first bar a location in the stream of video data of the second rendered stream that is displayed on the second part of the display device.

8. The method according to claim 1, wherein the method further comprises the step of:
providing an indicator indicative of a direction of the non-real-time rendering.

9. The method according to claim 1, further comprising the step of:
providing an audio signal at real-time, synchronized with the first rendered stream.

10. An apparatus for providing a video signal for display of a stream of video data at a rate other than real-time, the stream of video data being built up from subsequent frames, the apparatus comprising:
first means for selecting a plurality of non-contiguous segments of the stream of video data, each of said plurality of non-contiguous segments comprising multiple subsequent frames;
a first rendering unit for real-time rendering the plurality of non-contiguous segments in a concatenated manner to form a first rendered stream having a first rate other than real-time;
second means for selecting a plurality of pre-determined non-subsequent frames of said stream of video data;
a second rendering unit for non real-time rendering of the plurality of pre-determined non-subsequent frames in a concatenated manner to form a second rendered stream having a second rate other than real-time; and
a multiplexer for multiplexing the first rendered stream and the second rendered stream for simultaneous display on a display device,
wherein the first rendered stream is displayed on a first part of the display device and the second rendered stream is displayed on a second part of the display device; and
wherein the second rate is greater than the first rate and real-time.

11. A non-transitory computer-readable storage medium having stored thereon programmable instructions configured for being executed by at least one processor for performing a method suitable for providing a video signal for display of a stream of video data at a rate other than real-time, the stream video data being built up from subsequent frames, the method comprising:
Selecting a plurality of non-contiguous segments of the stream of video data, each of said plurality of non-contiguous segments comprising multiple subsequent frames;
real-time rendering of the plurality of non-contiguous segments in a concatenated manner to form a first rendered stream having a first rate other than real-time;
selecting a plurality of pre-determined non-subsequent frames of said stream of video data;
non-real-time rendering of the plurality of pre-determined non-subsequent frames in a concatenated manner to form a second rendered stream having a second rate other than real-time; and
multiplexing the first rendered stream and the second rendered stream for simultaneous display on a display device,
wherein the first rendered stream is displayed on a first part of the display device and the second rendered stream is displayed on a second part of the display device; and
wherein the second rate is greater than the first rate and real-time.

12. A method of providing a video signal for display of a stream of video data at a rate other than real-time, the stream of video data being built up from subsequent frames, the method comprising the steps of:
Selecting a plurality of non-contiguous segments of the stream of video data, each of said plurality of non-contiguous segments comprising multiple subsequent frames;
real-time rendering of the plurality of non-contiguous segments in a concatenated manner to form a first rendered stream having a first rate other than real-time;
selecting a plurality of pre-determined non-subsequent frames of said stream of video data;
non-real-time rendering of the plurality of pre-determined non-subsequent frames in a concatenated manner to form a second rendered stream having a second rate other than real-time;
multiplexing the first rendered stream and the second rendered stream for simultaneous display on a display device;
wherein the first rendered stream is displayed on a first part of the display device and the second rendered stream is displayed on a second part of the display device; and
wherein the second rate is greater than the first rate and real-time;

providing a first bar representative of the stream of video data;

indicating on the first bar a location in the stream of video data of the first rendered stream that is displayed on the first part of the display device; and indicating on the first bar a location in the stream of video data of the second rendered stream that is displayed on the second part of the display device.

* * * * *